W. J. BROOME.
AUTOMOBILE CREEPER.
APPLICATION FILED FEB. 1, 1918.
1,302,301.
Patented Apr. 29, 1919.
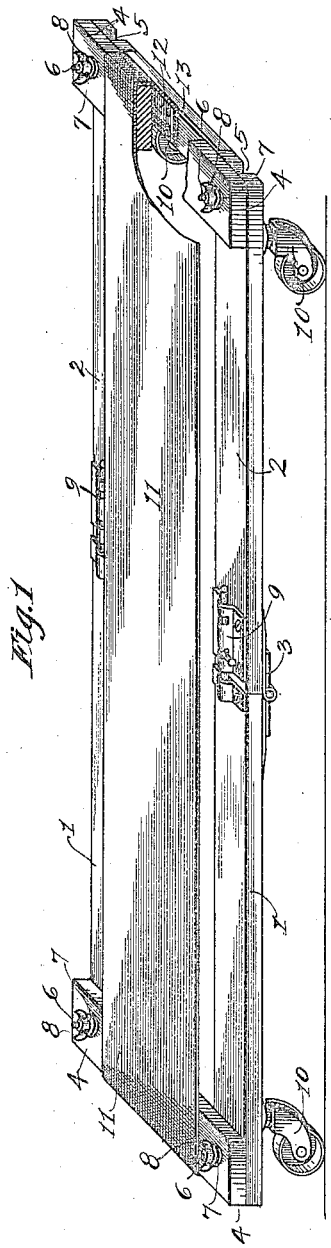
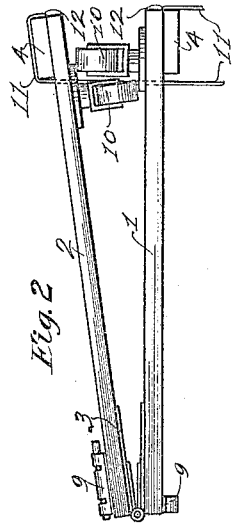
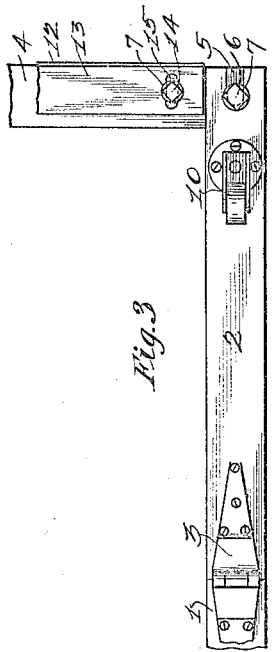
INVENTOR.
William J. Broome,
BY
Mach & Litzenberg
ATTORNEY.

UNITED STATES PATENT OFFICE.

WILLIAM J. BROOME, OF LOS ANGELES, CALIFORNIA.

AUTOMOBILE-CREEPER.

1,302,301.  Specification of Letters Patent.  Patented Apr. 29, 1919.

Application filed February 1, 1918. Serial No. 215,531.

*To all whom it may concern:*

Be it known that I, WILLIAM J. BROOME, a citizen of the United States, and a resident of Los Angeles, in the county of Los Angeles and State of California, have invented new and useful Improvements in Automobile-Creepers, of which the following is a specification.

My invention relates to a type of device, generally known and used for the purpose of moving and supporting a mechanic upon his back beneath a motor vehicle or the like, and the main object is to provide in such a device means whereby the supporting frame may be collapsed and folded together compactly so as to occupy a minimum space when not in use and also to render the device portable and thus adaptable for use by motor car owners and operators for emergencies.

A further object is to provide a separable frame including longitudinal and transverse members detachably held together and capable of being packed longitudinally of each other, and a bed member supported on said frame and capable of adjustment as to tension for supporting the human body beneath the vehicle.

A further object is to provide means for locking and firmly holding the frame members in extended relation during use.

A further object is to provide casters or rollers by means of which the device may be moved about on the ground or floor beneath the vehicle to convenient points. Other objects may appear as the description progresses.

A preferred form of my improved device is illustrated in the acompanying drawing, in which Figure 1 is a perspective view of the assembled device; Fig. 2 is a side elevation of the same folded together for packing, and Fig. 3 is a partial bottom plan showing details of the structure. Similar characters of reference are employed throughout the several views of the drawings and in the specification for indicating the same or like parts.

The frame is composed of a pair of like longitudinal members 1 and 2, on each side with the members of each of said pairs hinged together at their inner ends and in the exact center of the frame by means of reinforced strap hinges 3, and a relatively shorter transverse member 4, at each end. Members 4 are provided with slots 5 at their outer ends, which are substantially elongated and are adapted to removably receive bolts 6 carried by the ends of the transverse members 4, suitable washers 7, and wing nuts 8, being provided on said bolts by means of which the members may be firmly clamped together.

Ordinary door bolts, as at 9, 9, or other suitable devices may be provided at the junction of the inner ends of the members 1 and 2 of each pair by means of which the said members are held together as a single member, and the frame thus held in extended position.

Each of the longitudinal frame members 1 and 2 has a caster as at 10, 10, etc., supported in a swivel bracket on the lower side thereof, and the caster on the member 1 of each pair is positioned closer to the junction of the two members, so that when said members are folded, as shown in Fig. 2, the casters will not interfere. There are, therefore, 4 casters on the frame for movably supporting the device on the ground or floor, and the device may be moved about to any desired position beneath the vehicle by the hands or feet of the vehicle operator or mechanic.

The bed of the device comprises a sheet of substantially thick and heavy canvas or other suitable and durable fabric, as at 11, having its ends 12 secured by tacks or otherwise to cleats 13, which are transversely disposed and extend across the space between the members 1, 1 and 2, 2, and beneath the members 4, as clearly shown. The cleats 13 are detachably and adjustably held on the transverse members 4 of the frame by means of bolts 14, carried by members 4, and preferably countersunk at their heads and extended through elongated slots 15 formed transversely of the cleats so as to render the tension of the fabric bed adjustable by the movement of the bolts in the slots and the position of the cleats relative to the members 4.

Fig. 1 illustrates the relative function and position of the several elements of my ipmroved device in readiness for use, and it will be obvious that when the bolts 9, are unlocked and the wing nuts 8 are loosened on their bolts 6, the longitudinal members 1 and 2 of the frames may be folded together, as shown in Fig. 2, and the transverse members 4 removed therefrom, and the cleats 13 may also be disconnected from the members 4, whereupon members 4 may be positioned closely to and parallel with the members 1 and 2, and the fabric bed 11 wrapped around all of the members, thus forming a compact package capable of being carried beneath the seat of the vehicle for use in emergencies.

It will understood that while I have shown only a single embodiment of my invention, the details of structure may be changed and modified within the scope of the appended claims, and any suitable material may be used for the frame or bed which may be readily obtainable and convenient to the manufacturer, though a frame constructed of wood will generally be found most desirable because of its light weight.

What I claim is:

1. An automobile creeper comprising foldable side rails and transverse end rails removably attached thereto, cleats spanning the distance between said side rails and supported on said end rails, and a bed of fabric or the like attached to said cleats and adapted to be stretched over the tops of said end rails, said cleats having transverse slots formed therein, and bolts extended through said end rails and through said slots for adjustably holding the bed in position on said rails.

2. An automobile creeper comprising side rails, transverse rails mounted thereupon at the ends, cleats removably held on the bottom of said transverse rails, a bed of fabric or the like attached to said cleats and adapted to be stretched over the tops of said transverse rails, and bolts carried by said transverse rails, said cleats having transverse slots formed therein, whereby said cleats may be adjusted relative to said transverse rails.

Signed at Los Angeles, Los Angeles county, California, this 24th day of January, 1918.

WILLIAM J. BROOME.

In presence of—
D. P. KENDRICK,
LUTHER L. MACK.

Copies of this patent may be obtained for five cents each, by addressing the "Commissioner of Patents, Washington, D. C."